(12) United States Patent
Müller

(10) Patent No.: US 7,872,611 B2
(45) Date of Patent: Jan. 18, 2011

(54) LEAKY COAXIAL ANTENNA

(76) Inventor: Joachim Müller, Abt-Maurus-Str.3, 91785 Pleinfeld (DE)

( * ) Notice: Subject to any disclaimer, the term of this patent is extended or adjusted under 35 U.S.C. 154(b) by 313 days.

(21) Appl. No.: 12/162,191

(22) PCT Filed: Jan. 23, 2007

(86) PCT No.: PCT/EP2007/000554
§ 371 (c)(1), (2), (4) Date: Nov. 7, 2008

(87) PCT Pub. No.: WO2007/087998
PCT Pub. Date: Aug. 9, 2007

(65) Prior Publication Data
US 2009/0303149 A1    Dec. 10, 2009

(30) Foreign Application Priority Data
Feb. 2, 2006   (EP) .................... 06002185

(51) Int. Cl.
*H01Q 9/04*   (2006.01)
(52) U.S. Cl. ...................... 343/791; 343/790
(58) Field of Classification Search ............. 343/790, 343/791, 792, 770, 900
See application file for complete search history.

(56) References Cited

U.S. PATENT DOCUMENTS

| | | | | |
|---|---|---|---|---|
| 3,870,977 A | 3/1975 | Peoples et al. | ................ | 333/84 |
| 3,963,999 A * | 6/1976 | Nakajima et al. | ........... | 333/237 |
| 4,129,841 A | 12/1978 | Hildebrand et al. | ........... | 333/84 |
| 4,339,733 A | 7/1982 | Smith | ........................ | 333/237 |
| 4,599,121 A | 7/1986 | Edwards et al. | ................ | 156/48 |
| 5,465,395 A * | 11/1995 | Bartram | ...................... | 455/523 |
| 5,500,488 A | 3/1996 | Buckel | ........................ | 174/102 |
| 5,936,203 A | 8/1999 | Ryman | ........................ | 174/109 |
| 6,091,372 A * | 7/2000 | Dienes | ........................ | 343/770 |
| 6,480,163 B1 * | 11/2002 | Knop et al. | .................. | 343/770 |
| 7,527,623 B2 * | 5/2009 | Prakash et al. | ................ | 606/33 |

FOREIGN PATENT DOCUMENTS

| | | |
|---|---|---|
| DE | 26 36 523 A1 | 8/1976 |
| DE | 27 08 070 A1 | 2/1977 |
| RU | 2013832 | 5/1994 |
| RU | 2207670 | 4/2002 |

* cited by examiner

*Primary Examiner*—HoangAnh T Le
(74) *Attorney, Agent, or Firm*—Allan M. Wheatcraft

(57) ABSTRACT

The invention relates to a leaky coaxial antenna (10) comprising an inner conductor (1), a dielectric (2) around the inner conductor (1), and a first shield conductor (4) disposed around the dielectric (2), the first shield conductor having openings (41) distributed in longitudinal direction of the inner conductor (1) and being adapted in that electromagnetic energy passes through the openings (41). A second shield conductor (5) is disposed around or underneath the first shield conductor (4), the second shield conductor (5) being adapted to cover or mask at least a number of the openings (41) of the first shield conductor in a shielded section (S1-S12). The second shield conductor (5) is arranged discontinuously In the longitudinal direction of the antenna (10) defining uncovered or unmasked portions (AS1-AS12) of the first shield conductor (4) in the longitudinal direction of the antenna which are adapted in that electromagnetic energy passes through the uncovered portions (AS1-AS12). Thus, the present invention suggests a two-layer shield for improving the properties of a leaky coaxial antenna with respect to e.g. aerospace applications.

13 Claims, 2 Drawing Sheets

Figure 4:
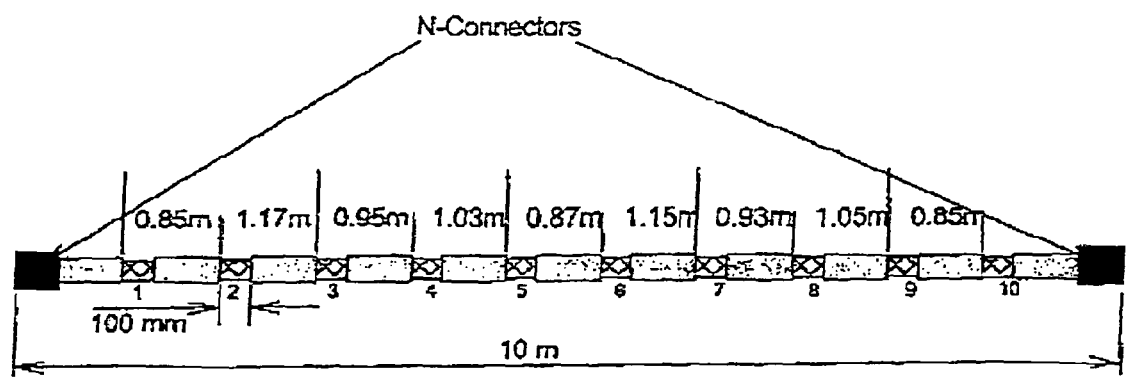

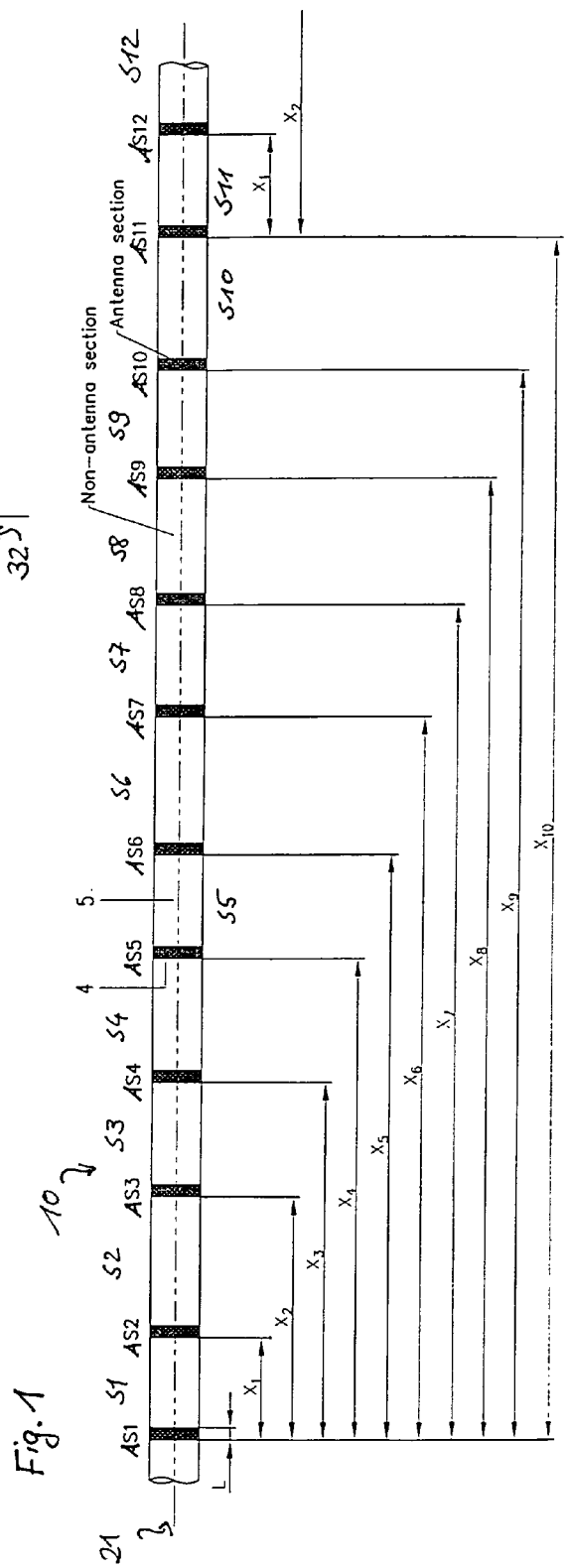
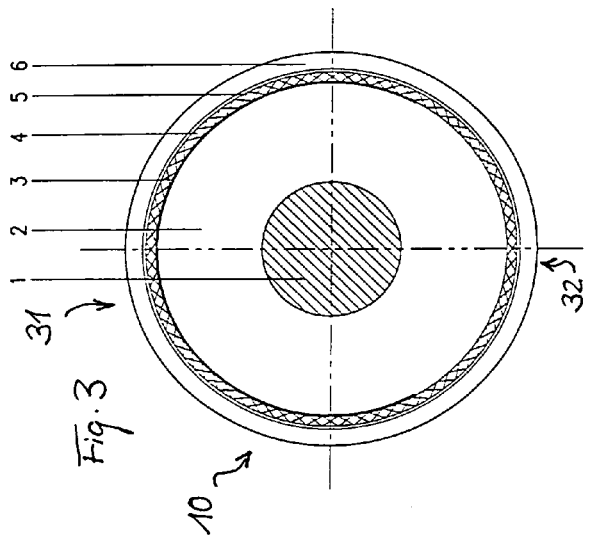
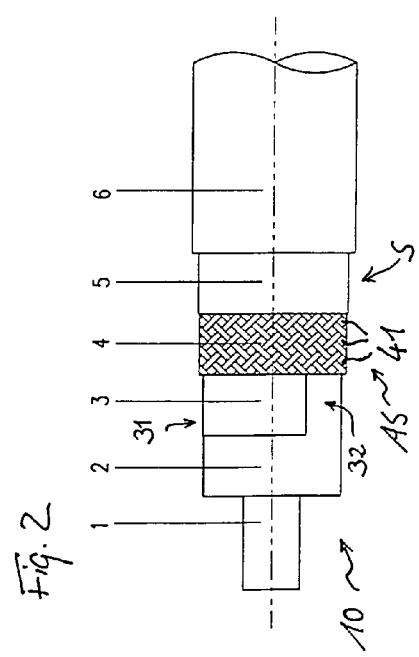

LEAKY COAXIAL ANTENNA

The present invention relates to a leaky coaxial antenna comprising an inner conductor, a dielectric around the inner conductor and a shield conductor disposed around the dielectric, the shield conductor having openings distributed in longitudinal direction of the inner conductor and being adapted in that electromagnetic energy passes through the openings. Particularly, such leaky coaxial antenna may be used in airplanes and in other applications.

Leaky and/or radiating coaxial cables may be employed as longitudinal antennas in confined spaces like tunnels, mines, buildings, and/or in other stretched-out applications involving a narrow lateral corridor (such as railroads and highways). In modern applications, such cables may be employed in stretched-out vehicles such as airplanes, were there is a need for one- or two-way communication. Leaky coaxial cables support surface waves, were a fraction of the power is radiated radially. Leaky coaxial cables operate in a radiating or a coupling mode. These modes correspond to an in-phase addition of all contributing apertures.

Most of the known leaky and/or radiating coaxial cables are heavy, large in diameter, and inflexible. Historically this has not been a problem, however, because the applications in which they are used, such as some of those mentioned above, do not require either lightweight or flexible cables. However, particularly for use in airplanes, for example, such drawbacks may be disadvantageous.

U.S. Pat. No. 4,599,121 is directed to a method of producing a leaky coaxial cable by using a continuous braided shield having openings therein produced by dropping ends of the shield wire as the braiding progresses in the manufacturing process.

U.S. Pat. No. 5,936,203 A is directed to a radiating coaxial cable with an outer conductor formed by continuous multiple conducting strips. The plurality of conductive strips are continuously wrapped in coaxial relationship to a centre conductor and separated by a dielectric core. The plurality of conductive strips define in combination another conductor of the radiating cable and define a plurality of gaps or apertures between the conductive strips for radiating and receiving electromagnetic energy in response to excitation of the cable.

U.S. Pat. No. 4,339,733 concerns a radiating cable comprising at least one centre conductor, a dielectric core surrounding the centre conductor and a plurality of radiating sheaths disposed in coaxial relationship to the centre conductor along the length of the dielectric core. Particularly, the sheaths are performed by continuous structures such as braids, helically or longitudinally wrapped structures.

DE 26 36 523 A1 is directed to a radiating coaxial transmission line which is covered with an insulating coating. Similar cylindrical radiating elements are equidistantly placed on the line and at a centre-to-centre distance equal to the wavelength of the centre frequency of the high frequency band as transmitted in and through the line. The insulating coating insulates the outer conductor with respect to the environment and establishes a supporting surface for the radiating elements. Each radiator has preferably a length equal to half the wavelength of the centre frequency of the transmission band to be radiated.

None of the known leaky and/or radiating coaxial cables, such as those embodied in some of the above references, meet all requirements for use in aerospace applications. While flexible designs using an open braid structure have limited bandwidth and high longitudinal losses, designs with a ridged outer conductor having openings have a large bend radius and lack flexibility. In particular, a leaky/radiating coaxial cable intended for use as a distributed antenna for wireless applications like WLAN and GSM in airplanes must meet many specific requirements. These requirements include that it must be flexible (have a bend radius of 32 mm with less than 1 Ohm impedance change), high bandwidth and wideband (400 MHz up to 6 GHz), lightweight (190 g/m), low longitudinal loss (attenuation of less than 0.36 dB/m at 6 GHz) in order to support operation within the frequency band up to antenna lengths of 60 m, for example. The leaky/radiating coaxial cable for use in an airplane must be flexible because it will be installed inside the airplane where many other obstacles require that the antenna cannot be run in a straight line. It must have high frequency response because many of the wireless communication standards operate at several GHz. It must have high bandwidth because each of the wireless communication standards operate in its own frequency band within one antenna. It must be lightweight to comply with airline specifications with the aim to minimize airplane weight. It must have low longitudinal loss to allow enough reach length while having sufficient radiation loss to function as a receiving and/or transmitting antenna. Finally, the radiation loss should be homogenous along the length and allow a sectional circumferential radiation pattern to maintain the specified noise immunity requirements defined by the application, for example an airplane specification.

The object of the present invention is, therefore, to provide a leaky coaxial antenna which is capable to improve at least some of the above-mentioned drawbacks of existing solutions.

This object is solved by a leaky coaxial antenna according to the features of claim 1 or claim 2. Embodiments of a leaky coaxial antenna according to the invention are evident from the dependent claims.

Particularly, according to a first aspect of the invention, a leaky coaxial antenna comprises an inner conductor, a dielectric around the inner conductor, and a first shield conductor disposed around the dielectric, the first shield conductor having openings distributed in longitudinal direction of the inner conductor and being adapted in that electromagnetic energy passes through the openings. A second shield conductor is disposed around the first shield conductor, wherein the second shield conductor is adapted to cover at least a number of the openings of the first shield conductor in a shielded section for preventing the electromagnetic energy from passing to the outside of the antenna within the shielded section. Moreover, the second shield conductor is arranged discontinuously in the longitudinal direction of the antenna defining uncovered portions of the first shield conductor in the longitudinal direction of the antenna which are adapted in that electromagnetic energy passes through the uncovered portions.

According to another aspect of the present invention, the second shield conductor is disposed underneath the first shield conductor, wherein the second shield conductor is adapted to mask at least a number of the openings of the first shield conductor in the shielded section for preventing the electromagnetic energy from passing to the outside of the antenna within the shielded section. Furthermore, the second shield conductor is arranged discontinuously in the longitudinal direction of the antenna defining unmasked portions of the first shield conductor in the longitudinal direction of the antenna which are adapted in that electromagnetic energy passes through the unmasked portions.

Thus, the present invention suggests a two-layer shield, comprising the first shield conductor and the second shield conductor for improving the properties of a leaky coaxial antenna, as referred to in the introductory part of the description. Particularly, both shield layers allow cable bending, however, since the second shield layer comprising the second shield conductor covers or masks the openings of the first shield layer comprising the first shield conductor over considerable parts of the cable length, the longitudinal loss of the coaxial transmission mode can be reduced significantly. This allows a combination of a flexible design with low longitudinal loss. The amount of transversal loss or radiation as well as the bandwidth and reach length of the leaky coaxial cable can be controlled by different attributes: the coverage of the second shield layer on top of the first shield layer, or by the masking of the second shield layer underneath the first shield layer, respectively, and the length of the uncovered or unmasked portions of the first shield layer (the openings of the second shield layer). Furthermore, the openings of the first shield layer (e.g. width and/or number) may be varied accordingly. This allows application of this invention to many applications. It has specific importance when high bandwidth and long reach length in combination with flexibility is required, such as in aerospace applications.

According to an embodiment of the present invention, the second shield conductor comprises multiple tubular sections which are arranged discontinuously in the longitudinal direction of the antenna defining the uncovered or unmasked portions, respectively, of the first shield conductor between the tubular sections.

In accordance with another embodiment of the present invention, the second shield conductor is arranged to be electrically coupled to the first shield conductor within the shielded section at least when the antenna is in operation. Thus, when the first shield conductor is connected to ground potential, the second shield conductor will also be connected to ground potential for performing shield function. According to an embodiment, the first shield conductor and the second shield conductor maintain galvanic contact to each other, so that both shield conductors are connected directly to one another. On the other hand, the first shield conductor may also be connected to the second shield conductor via materials having capacitive behaviour for coupling the second shield conductor to the first shield conductor via capacitive coupling. Such coupling is particularly arranged with respect to the operating frequencies of the leaky coaxial antenna. In this concern, for example a dielectric material arranged between the first shield conductor and the second shield conductor may serve as capacitive coupling element.

According to another embodiment of the present invention, a conductive strip is longitudinally disposed along a circumferential section of the dielectric to form a shielded segment of said openings and an unshielded segment of said openings, wherein the electromagnetic energy passes through the openings at said unshielded segment of said openings. Such conductive strip may be applied, for example, for focusing the electromagnetic energy into a preferred direction of the leaky coaxial antenna. Furthermore, such conductive strip may be used for concentrating the electromagnetic energy at certain locations of the antenna and reduces longitudinal loss.

According to yet another embodiment of the present invention, the first shield conductor and the second shield conductor are electrically coupled through the conductive strip.

The first shield conductor may comprise an open structure of wire conductors which do not cover the entire surface of the layer underneath. According to another embodiment, the first shield conductor comprises an open structured conductive foil mesh. Furthermore, the inner conductor may comprise a metal conductor which is wrapped around a plastic core. Such plastic core or plastic tube is preferably comprised of FEP (fluoroethylene propylene). The dielectric is preferably polytetrafluoroethylene, and most preferably expanded polytetrafluoroethylene. Preferably, a non-conductive jacket is disposed around the second shield conductor and the first shield conductor.

In a particular embodiment, the leaky coaxial antenna of the present invention may comprise the base coaxial cable described in U.S. Pat. No. 5,500,488 A and EP 0 635 850 A1 which is modified according to the principles of the present invention as described herein. That is, the basic principles described herein may be applied to such cable. Particularly, the inner conductor may be arranged around a plastic core wherein the inner conductor further comprises two layers with an inner layer in the form of an overlappingly and helically wrapped electrical conductive film and an outer layer in the form of served wires that are in electrical contact with the inner layer.

According to an embodiment of the present invention, the uncovered or unmasked portions, respectively, of the first shield conductor which form the sections of the coaxial antenna performing the antenna function have a distance between them in longitudinal direction of the antenna that varies along the length of the antenna. Particularly, the distance may vary in a randomized manner along the length of the antenna avoiding periodic resonances. Such periodic resonances can, if they occur, reduce performance of the leaky coaxial antenna. In this concern, varying in a randomized manner means a variable non-predetermined structure or legality of the distances between the uncovered or unmasked portions, respectively, of the first shield conductor.

According to another embodiment of the invention the uncovered or unmasked portions, respectively, of the first shield conductor have a width in longitudinal direction of the antenna that varies along the length of the antenna. Particularly, the uncovered or unmasked portions, respectively, may have a width that gets wider as the cable is traversed from the transmit end to the receive end in order to produce a more homogeneous radiation power loss along the length of the antenna.

According to yet another embodiment of the invention, a combination of varying the widths of the uncovered or unmasked portions, respectively, and varying distances between the portions is invoked in order to, in a combinative effect, produce homogeneous loss and to avoid periodic resonances that can reduce performance.

The various components of the inventive leaky coaxial antenna can be disposed in any suitable order. For example, the coaxial antenna has a weight of about 190 g/m or less (although depending on the ultimate application, weight may not be critical), a bend radius is less than 32 mm, a bandwidth from 400 MHz to 6 GHz, and a longitudinal attenuation of less than 0.36 dB per meter at a frequency of 6 GHz.

Further embodiments and advantageous features of the present invention are evident from the dependent claims.

Figure 5:
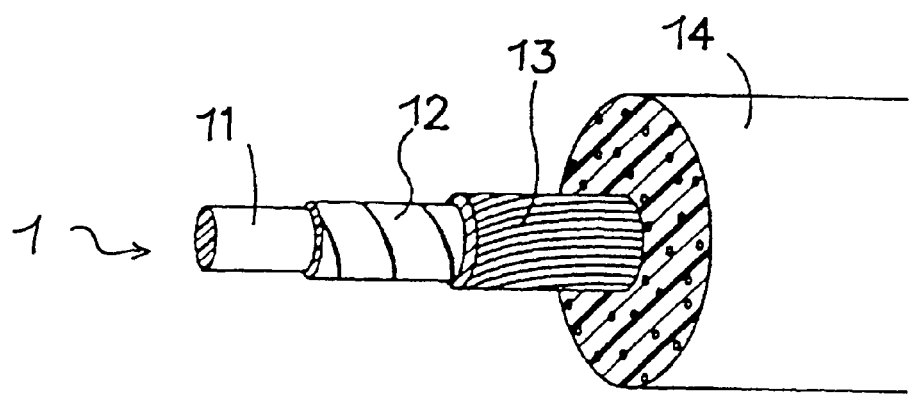

The invention will be better understood by reference to the following description of embodiments of the invention taken on conjunction with the accompanying drawings, wherein FIG. 1 shows a side view of an exemplary leaky coaxial antenna according to an embodiment of the present invention, FIG. 2 is a side view of an exemplary leaky coaxial antenna according to an embodiment of the present invention showing each of the various components disposed according to an embodiment of the invention, FIG. 3 is a cross-sectional view of the exemplary leaky coaxial antenna of FIG. 2, FIG. 4 is a side view of another exemplary leaky coaxial antenna assembly according to another embodiment of the present invention, FIG. 5 shows parts of another embodiment of a leaky coaxial antenna according to the invention.

The invention will now be described with particular reference to embodiments of the invention illustrated in the accompanying Figures. FIG. 1 is a side view of an exemplary leaky coaxial antenna 10 according to an embodiment of the present invention. The coaxial antenna 10 is coupleable to a connector 21 (not shown) on at least one end thereof. A second shield conductor 5 is arranged discontinuously in the longitudinal direction of the antenna 10 defining uncovered portions of a first shield conductor 4 discontinuously in discrete positions in the longitudinal direction of the antenna.

More details of the leaky coaxial antenna according to the invention are shown with reference to FIGS. 2 and 3. The leaky coaxial antenna 10 comprises an inner conductor 1 which may be a metal or which may be metal wrapped around a plastic tube as described herein below in more detail. A dielectric 2 is disposed around the inner or centre conductor 1, which dielectric may be any insulating material. For example, dielectric 2 is polytetrafluoroethylene (PTFE). Particularly, dielectric 2 may be expanded polytetrafluoroethylene (ePTFE).

According to an embodiment, the leaky coaxial antenna 10 has a conductive strip 3 disposed along a circumferential section of the dielectric 2 in longitudinal direction of the antenna to form a shielded segment 31 and an unshielded segment 32, wherein electromagnetic energy may pass to the outside of the antenna at said unshielded segment 32. Conductive strip 3 may be a metal or metalized foil or another conductive layer. By disposing conductive strip 3 along the length of coaxial antenna 10 covering just a section of the outer surface thereof, electromagnetic energy couples or radiates out of the unshielded segment 32 in a direction away from conductive strip 3. In this manner, the electromagnetic energy and radiation pattern may be focused in particular directions, thereby controlling the directivity of the coaxial antenna. This is particularly important if the near field and/or far field electromagnetic field density needs to be controlled in sensitive areas such as areas that contain electromagnetic interference (EMI) sensitive equipment.

A first shield conductor 4 is disposed around the dielectric 2 and the conductive strip 3, respectively, wherein the first shield conductor 4 has openings 41 distributed in longitudinal direction of the inner conductor 1. Thus, the first shield conductor 4 is arranged in that electromagnetic energy passes through the openings 41. The first shield conductor 4 is disposed coaxially around the dielectric 2 and the conductive strip 3. The shield conductor 4 may be a braid or a foil mesh. The important requirement for the shield conductor material 4 is that it contains openings through which electromagnetic energy can radiate or couple. Further, a second shield conductor 5 is disposed around the first shield conductor 4, wherein the second shield conductor 5 is adapted to cover at least a number of the openings 41 of the first shield conductor 4 in a shielded section, such as S1 to S12 shown in FIG. 1. In these shielded sections S1 to S12 the electromagnetic energy is prevented from passing to or from the outside of the antenna within the respective shielded section. The second shield conductor 5 may be foil or any other suitable conductive material. A non-conductive jacket 6 may be disposed over all of the components of coaxial antenna 10.

The various components of leaky coaxial antenna 10 of the present invention are illustrated in the Figures in respective embodiments. For example, the second shield conductor 5 may be disposed underneath the first shield conductor 4, wherein the second shield conductor 5 is arranged to mask at least a number of the openings 41 of the first shield conductor 4 in the shielded sections S1 to S12. Accordingly, such shield conductor 5 is arranged discontinuously in the longitudinal direction of the antenna defining unmasked portions of the first shield conductor 4 in the longitudinal direction of the antenna. Such unmasked portions AS1 to AS12 of the first shield conductor 4 are adapted in that electromagnetic energy passes through the unmasked portions AS1 to AS12. Thus, the unmasked portions AS1 to AS12 are adapted to function as antenna sections. Moreover, conductive strip 3 may be disposed under, between, or over either or both of the first shield conductor 4 and the second shield conductor 5.

In accordance with the embodiment of FIG. 1, the second shield conductor 5 is arranged discontinuously in the longitudinal direction of the antenna 10 defining uncovered portions AS1 to AS12 of the first shield conductor 4 arranged discontinuously and at discrete locations in the longitudinal direction of the antenna. The same basic principle may be applied when the second shield conductor 5 is disposed underneath the first shield conductor 4 defining unmasked portions AS1 to AS12 of the first shield conductor 4 in the longitudinal direction of the antenna. Particularly, according to FIG. 1, the second shield conductor 5 comprises multiple tubular sections S1 to S12, as shown in the cross-sectional view of FIG. 3 by means of reference numeral 5. Such multiple tubular sections are arranged discontinuously in the longitudinal direction of the antenna 10 defining the discontinuous or discrete uncovered or unmasked portions AS1 to AS12 between the tubular sections S1 to S12, which uncovered or unmasked portions AS1 to AS12 are also of tubular or ring form and function as antenna sections of the leaky coaxial cable 10. In contrast, the shielded sections S1 to S12 provide shield function (non-antenna function).

Particularly, the axial length of each of the tubular sections S1 to S12 is made rather great and is, for example, distinctly greater than the half of the wavelength of the operating frequencies. Surface waves shall be enabled to dispread.

In order to provide shield function, the second shield conductor 5 is arranged to be electrically coupled to the first shield conductor 4 within the shielded sections S1 to S12, at least with respect to the respective operating frequency when the antenna 10 is in operation. Particularly, the first shield conductor 4 and the second shield conductor 5 maintain galvanic contact to each other, so that the second shield conductor 5 is at ground potential when the first shield conductor 4 is coupled to ground potential. Thus, the first shield conductor 4 radiates or couples electromagnetic energy to the outside of the shield conductor 4 over its whole length, i.e. over the whole length of the coaxial antenna as the first shield conductor 4 is arranged over the whole length of the antenna. This first shield conductor 4 is thus arranged to provide antenna function of the leaky coaxial antenna 10. In contrast, the second shield conductor 5 is arranged to provide blocking function within discontinuous shielded sections S1 to S12 preventing the electromagnetic energy from passing to the outside of the antenna within the respective shielded section S1 to S12.

Therefore, the electromagnetic energy of coaxial antenna 10 is transmitted through the uncovered or unmasked portions AS1 to AS12 where the second shield conductor 5 provides openings. The width L of these uncovered or unmasked portions AS1 to AS12 may be varied in order to tune the antenna to specific frequencies and to adjust return loss and coupling loss. Moreover, each of the sections AS2 to AS11 are arranged in a respective distance $X_1$ to $X_{10}$ from section AS1, which distances may vary as regards their relationship to one another. Particularly, the uncovered or unmasked portions AS1 to AS12 may have a distance between them in the longitudinal direction of the antenna that varies along the length of the antenna. Particularly, such distance may vary in a randomized manner along the length of the antenna for avoiding periodic resonances. Thus, the shown distances $X_1$ to $X_{10}$ as shown in FIG. 1 may be chosen in a randomized manner particularly avoiding equidistantly spaced uncovered or unmasked portions AS1 to AS12. In combination, the width L of the portions AS1 to AS12 and the distance between them may be varied in order to tune the antenna to specific frequencies and to adjust return loss and coupling loss.

Because signals must be carried longitudinally down coaxial antenna 10, the open structured shield conductor 4 is also disposed coaxially around coaxial antenna 10, wherein the shield conductor 4 is disposed around the cable along its entire length so that conductivity is maintained longitudinally. Because of the open structure of the shield conductor 4, however, electromagnetic energy is allowed to couple or radiate through the open structure of the shield conductor 4 at the openings 41.

In FIG. 5, there is shown a side view of parts of another exemplary leaky coaxial antenna according to an embodiment of the present invention. According to this embodiment, the centre or inner conductor 1 comprises a different structure in accordance with the principles as described in U.S. Pat. No. 5,500,488 A. According to this embodiment, the inner conductor 1 is arranged around a plastic core 11 wherein the inner conductor comprises two layers 12 and 13. The inner layer 12 is in the form of an overlappingly and helically wrapped electrical conductive film, whereas the outer layer 13 is in the form of served wires that are in electrical contact with the inner layer 12. The layer 12 may be in the form of a silver-plated copper film wrapped around the plastic core 11, wherein in the present embodiment a combination of twisted round silver-plated copper conductors 13 is applied over the copper film 12. The dielectric 14 covers the inner conductor 1. With such construction a wide-band high frequency compatible electrical coaxial cable may be provided which combines wide-band high frequency compatible transmission properties which satisfy the need for a low-attenuation coaxial cable which optimizes desired electrical and mechanical properties as well as manufacturing costs, in combination with antenna properties as described herein. Moreover, low cable weight and high flexibility may be provided.

FIG. 4 shows a side view of another exemplary leaky coaxial antenna according to another embodiment of the present invention showing concrete distances between the respective portions AS1 to AS10. According to this example, the width L of the portions AS1 to AS10 is kept constant over the shown length of the cable.

The present invention therefore suggests a two-layer shield for improving the properties of a leaky coaxial antenna. Particularly, both shield layers allow cable bending, however, since the second shield layer comprising the second shield conductor covers or masks the openings of the first shield layer comprising the first shield conductor over considerable parts of the cable length, the longitudinal loss of the coaxial transmission mode can be reduced significantly. This allows a combination of a flexible design with low longitudinal loss. The amount of transversal loss or radiation as well as the bandwidth and reach length of the leaky coaxial cable can be controlled by the coverage of the first shield layer, or by the masking of the first shield layer, respectively, and the length of the uncovered or unmasked portions of the first shield layer (the openings of the second shield layer). This allows application of this invention to many applications. It has specific importance when high bandwidth and long reach length in combination with flexibility is required, such as in aerospace applications.

Applicant has produced examples of the inventive coaxial antenna and compared them to conventional coaxial cables. These examples and the results of the testing are reported below.

EXAMPLE 1

A coaxial antenna according to the present invention was constructed as shown in FIG. 4. The following tests were performed in order to test the practical effectiveness of the proposed invention.

The bend radius was measured by wrapping the coaxial antenna of FIG. 4 180° around mandrels of various diameters and measuring the change in characteristic impedance. The characteristic impedance was measured using a Time Domain Reflectometer [Tektronix TDS 8000 with a TDR sampling module 80E04]. The results showed that the change in characteristic impedance was less than 1 Ohm for mandrel diameters of greater than or equal to 32 mm. This test gave a good indication that the coaxial antenna could be used in applications requiring bends and/or some flexibility.

The frequency response of the coaxial antenna of Example 1 was measured using an Agilent 8753ES Vector Network Analyzer. Both Insertion Loss S21 and Return Loss S11 were measured over a frequency range of 300 kHz to 6 GHz. To get a baseline performance level these measurements were first performed with the coax antenna of Example 1 before openings were put into the outer second shield conductor (longitudinal attenuation) and second after such openings were introduced into the coax antenna (longitudinal and transversal attenuation). The results were as follows: the baseline (non-antenna) cable had longitudinal Insertion Loss of 0.19 dB/m at 2.5 GHz and 0.31 dB/m at 6 GHz. After the openings were introduced the combination of longitudinal and transversal loss was measured to be 0.24 dB/m at 2.5 GHz and 0.57 dB/m at 6 GHz. Return Loss of the leaky line antenna was measured to be less than −18 dB for frequencies less than 6 GHz. In addition, a Transfer Impedance measurement was performed to derive the antenna efficiency using a Vector Network Analyzer ZVCE from Rhode & Schwarz. The test was performed in a shielded room. The wire injection method described in the International Electrotechnical Commission standards document IEC 61196-1 was implemented over a frequency range of 20 kHz to 3 GHz. The test sample was a 0.5 m long coaxial antenna with one opening. Both ends are terminated into brass fixtures to provide defined grounding conditions. The antenna efficiency was measured −15 dB at 800 MHz and −10 dB at 2.5 GHz. These experiments showed that the radiating/leaky coaxial antenna of Example 1 exhibited high bandwidth, i.e. 400 MHz to 6 GHz.

Another experiment performed was to hook up the coaxial antenna of Example 1 in a practical situation representing a system in use: a WLAN network was established using the coaxial antenna of this example between two computers. The WLAN Access Point [SMC EliteConnect Universal Wireless Access Point SMC2555W-AG] was connected to 60 m of the coaxial antenna of this example. A 10 m section was suspended about 2 metres above the ground and a receiver was positioned at various points beneath the suspended antenna and the performance was measured. The receiver comprised a mobile computer [Dell® Lattitude] with a wireless LAN card [SMC EliteConnect Universal Wireless Cardbus Adapter SMC2536W-AG]. The WLAN link quality was measured using software that came with the WLAN antenna and indicated a maximum link quality within a 5 metre distance from the suspended antenna.

While particular embodiments of the present invention have been illustrated and described therein, the present invention should not be limited to such illustrations and descriptions. It should be apparent that changes and modifications may be incorporated and embodied as part of the present invention within the scope of the claims.

What is claimed is:

1. A leaky coaxial antenna comprising:
   an inner conductor,
   a dielectric around the inner conductor,
   a first shield conductor disposed around the dielectric, the first shield conductor having openings distributed in longitudinal direction of the inner conductor and being adapted in that electromagnetic energy passes through the openings,
   characterized by
   a second shield conductor disposed around the first shield conductor, the second shield conductor being adapted to cover at least a number of the openings of the first shield conductor in a shielded section, wherein the second shield conductor is arranged discontinuously in the longitudinal direction of the antenna defining tubular shield sections and uncovered portions of the first shield conductor in the longitudinal direction of the antenna, which are adapted in that electromagnetic energy passes through the uncovered portions, and
   wherein each of the tubular shield sections is having an axial length distinctly greater than half of a wavelength of operating frequencies for preventing the electromagnetic energy from passing to the outside of the antenna within each of the tubular shield sections.

2. The leaky coaxial antenna of claim 1, wherein the second shield conductor comprises multiple tubular sections arranged discontinuously in the longitudinal direction of the antenna defining the uncovered or unmasked portions, of the first shield conductor between the tubular sections.

3. The leaky coaxial antenna of claim 1, wherein the second shield conductor is arranged to be electrically coupled to the first shield conductor within the shielded section at least when the antenna is in operation.

4. The leaky coaxial antenna of claim 1, wherein the first shield conductor and the second shield conductor maintain galvanic contact to each other.

5. The leaky coaxial antenna of claim 1 further comprising a conductive strip longitudinally disposed along a circumferential section of the dielectric to form a shielded segment of said openings and an unshielded segment of said openings, wherein said electromagnetic energy passes through said openings at said unshielded segment of said openings.

6. The leaky coaxial antenna of claim 5, wherein the first shield conductor and the second shield conductor are electrically coupled through said conductive strip.

7. The leaky coaxial antenna of claim 1, wherein
   the first shield conductor comprises an open structure of wire conductors which do not cover the entire surface of the layer underneath.

8. The leaky coaxial antenna of claim 1, wherein
   the first shield conductor comprises an open structured conductive foil, a conductive mesh, served wires, or braided wires.

9. The leaky coaxial antenna of claim 1, wherein
   the uncovered or unmasked portions, of the first shield conductor have a distance between them in longitudinal direction of the antenna that varies along the length of the antenna, particularly varies in a randomized manner along the length of the antenna avoiding periodic resonances.

10. The leaky coaxial antenna of claim 1, wherein
    the uncovered or unmasked portions, of the first shield conductor have a width in longitudinal direction of the antenna that varies along the length of the antenna.

11. The leaky coaxial antenna of claim 1, wherein
    the inner conductor comprises a metal conductor wrapped around a plastic core.

12. The leaky coaxial antenna of claim 1, wherein
    the inner conductor is arranged around a plastic core and wherein the inner conductor further comprises two layers with an inner layer in the form of an overlappingly and helically wrapped electrical conductive film and an outer layer in the form of served wires that are in electrical contact with the inner layer.

13. A leaky coaxial antenna comprising:
    an inner conductor,
    a dielectric around the inner conductor,
    a first shield conductor disposed around the dielectric, the first shield conductor having openings distributed in longitudinal direction of the inner conductor and being adapted in that electromagnetic energy passes through the openings,
    characterized by
    a second shield conductor disposed underneath the first shield conductor, the second shield conductor being adapted to mask at least a number of the openings of the first shield conductor in a shielded section for preventing the electromagnetic energy from passing to the outside of the antenna within the shielded section,
    wherein the second shield conductor is arranged discontinuously in the longitudinal direction of the antenna defining unmasked portions of the first shield conductor in the longitudinal direction of the antenna which are adapted in that electromagnetic energy passes through the unmasked portions.

* * * * *

UNITED STATES PATENT AND TRADEMARK OFFICE
CERTIFICATE OF CORRECTION

| | | |
|---|---|---|
| PATENT NO. | : 7,872,611 B2 | |
| APPLICATION NO. | : 12/162191 | |
| DATED | : January 18, 2011 | |
| INVENTOR(S) | : Joachim Muller | |

It is certified that error appears in the above-identified patent and that said Letters Patent is hereby corrected as shown below:

At column 9, line 40: delete "or unmasked".

At column 10, line 13: delete "or unmasked".

At column 10, line 20: delete "or unmasked".

Signed and Sealed this
Twenty-second Day of February, 2011

David J. Kappos
*Director of the United States Patent and Trademark Office*